Dec. 18, 1934.  D. W. DANA  1,984,465
METHOD OF AND APPARATUS FOR DETECTING STRUCTURAL DEFECTS IN MATERIALS
Filed Jan. 5, 1931.
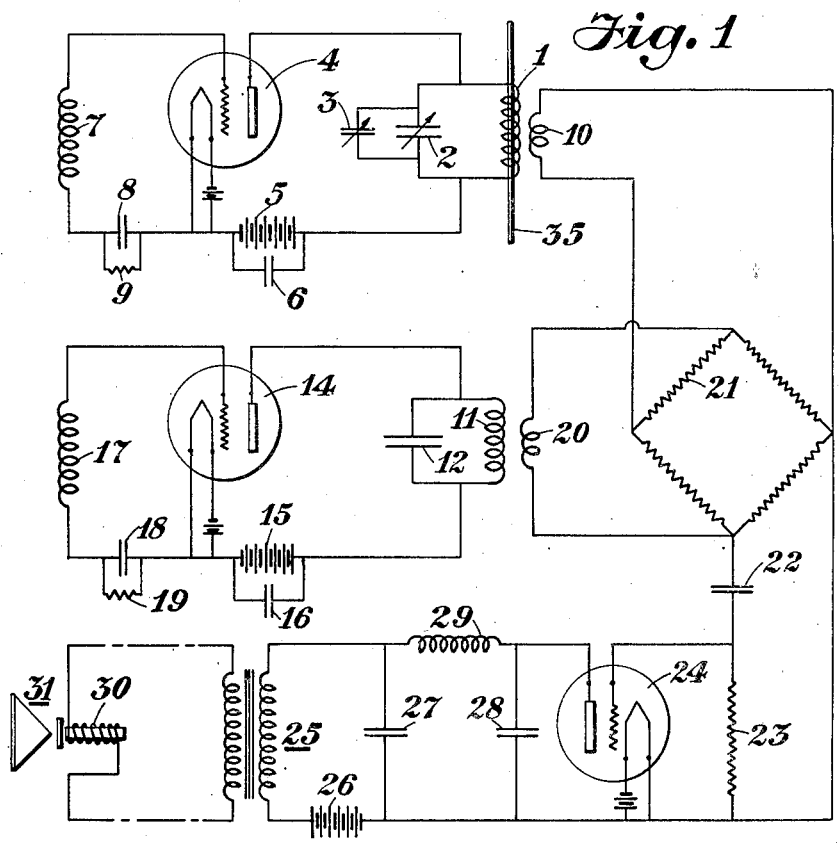
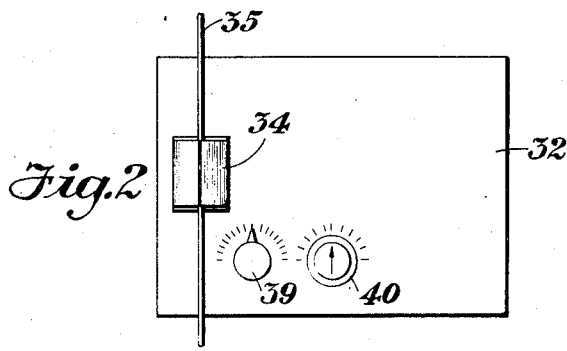
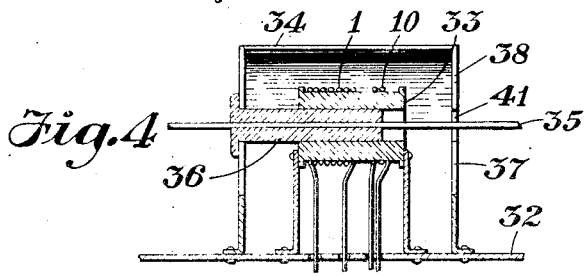
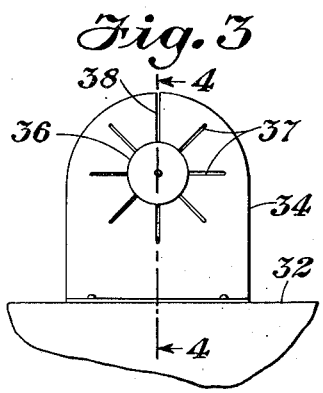
INVENTOR
David W. Dana
BY
ATTORNEY Patented Dec. 18, 1934

1,984,465

UNITED STATES PATENT OFFICE 1,984,465

METHOD OF AND APPARATUS FOR DETECTING STRUCTURAL DEFECTS IN MATERIALS

David W. Dana, Cliffside, N. J., assignor to General Electric Vapor Lamp Company, Hoboken, N. J., a corporation of New Jersey Application January 5, 1931, Serial No. 506,663

15 Claims. (Cl. 175—183)

The present invention relates to the testing of materials to determine variations or defects therein.

A particular object of the invention is to provide a convenient method of locating flaws in electrically conducting wires, rods and the like, and especially minute flaws in or near the surface thereof. A further object of the invention, is to provide a suitable apparatus for testing such electrically conducting bodies according to my new method. Other objects and advantages of my new invention will appear from the following detailed specification, or from an inspection of the accompanying drawing.

The invention consists in the steps of a novel method, and in the novel combination of apparatus, as hereinafter set forth and claimed.

As a result of the extreme difficulty with which tungsten and similar materials are worked, conductors formed of these materials occasionally have flaws, such as longitudinal cracks, therein. While for many purposes the presence of these flaws in the wire is not particularly detrimental, experience has taught that they render the wire entirely unsuitable for sealing into vitreous bodies, since the vitreous materials commonly employed have too high a viscosity to flow into the relatively deep crevices in the wire during the fusion process, even when said cracks extend to the surface of the wire. A minute passage is thus frequently left through the seal, if defective wire is unwittingly used, which permits a slow leakage of gas therethrough, this leakage in some cases being so slow that it is not detected until the device into which the defective conductor is sealed has been completed, in which case the loss directly attributable to the flaws in the wire may be appreciable. Since many of these flaws are either so concealed or so minute that they are practically invisible, even under a microscope, visual inspection of the wire is not only extremely arduous but somewhat uncertain, especially after the eyes of the operator become fatigued. As a result a better method of inspection, which could be more easily practiced, and which at the same time would be absolutely certain to detect all flaws in the wire, has been greatly desired. I have now discovered a novel method of inspecting wire or the like which not only eliminates the visual fatigue heretofore involved, but which also possesses the required degree of certainty. This new method utilizes the appreciable variations in the electrical characteristics of the wire resulting from the presence of flaws in the surface thereof to give a desired signal.

I have, moreover, found that this new method is extremely useful in the inspection of composite conductors, such as the copper coated nickel-steel wire known to the trade as "dumet". Such conductors occasionally have thin spots in the surface coating which are likely to cause defective seals, and since there is no visible indication of such faults, the detection thereof has heretofore been virtually impossible. It has been found, however, that these variations in the surface coating cause a sufficient change in the electrical characteristics of the wire to be successfully detected by my new method of testing electrical conductors.

According to a preferred form of my invention a loud audible signal is given whenever a crack or other surface or sub-surface flaw passes through the apparatus which I have provided to carry out my new method of inspection, thus positively attracting the attention of even a careless or fatigued operator, so that to a large extent the apparatus eliminates the possibility of human failure in the operation thereof. In cases where it is desired the apparatus may also be caused to produce a continuous record of the condition of the wire.

For the purpose of illustrating my invention I have shown a preferred embodiment thereof in the accompanying drawing, in which Fig. 1 is a diagram showing the circuits employed to detect cracks in a wire, Fig. 2 is a plan view of the apparatus, Fig. 3 is an elevational view of a portion of the apparatus, and Fig. 4 is a sectional view on the line 4—4 of Fig. 3.

In the drawing, with particular reference to Fig. 1, there is shown an oscillation generator having an oscillatory circuit comprising the inductance 1, and a variable condenser 2, the latter having a vernier condenser 3 in parallel therewith. Said inductance 1 is preferably relatively small, say of the order of 10 microhenries. The plate of a three element electron tube 4 is connected to one end of said inductance 1, while the opposite end of said inductance is connected through a battery 5 and condenser 6, in parallel, to the filament of said electron tube 4. The grid of said electron tube 4 is connected through an inductance 7 and a condenser 8, the latter having a high resistance 9 in parallel therewith, to the filament of said tube 4. When so connected an oscillatory current is induced in a well known manner in the coil 1, the frequency of this oscillatory current being determined, in part by the capacity of the condensers 2 and 3, and in part by another variable as will be discussed hereinafter.

A second oscillation generator has an oscillatory circuit comprising an inductance 11 and a condenser 12, one end of said inductance 11 being connected to the plate of a three element electron tube 14, while the other end of said inductance is connected in a conventional manner through a battery 15 having a condenser 16 in parallel therewith to the filament of said tube 14. The grid of said tube 14 is connected through the inductance 17 and a condenser 18, the latter having a high resistance 19 in parallel therewith, to the filament of said tube 14. A high frequency oscillatory current is thus induced in a well known manner in the coil 11, the frequency of said oscillatory current being determined by the constants of the circuit.

An inductance 10, which is coupled with the coil 1, is connected to diametrically opposite corners of the non-inductive resistance bridge 21, while another inductance 20, which is coupled with the coil 11, is connected between the remaining corners of said bridge 21. A condenser 22 and resistance 23 are connected across one leg of said resistance bridge 21, it being apparent that said resistance will be thus traversed by currents from each of the aforesaid generators, which currents will have a resultant or beat frequency whenever said generators have dissimilar frequencies.

The filament of a three element electron tube 24, which is adapted to serve as a rectifier, is connected to one end of the resistance 23, while the opposite end of said resistance is connected to the grid of said tube 24. The plate of said tube is connected through the primary of an audio frequency transformer 25 and a battery 26 to the filament of said tube 24, suitable filter condensers 27 and 28 and a radio frequency choke 29 being connected in the output circuit in a conventional manner, since it is desirable to keep radio frequency currents out of said transformer 25. The operating coil 30 of a suitable reproducing device, such as a speaker 31, is connected across the secondary of the audio transformer 25, several stages of audio frequency amplification of any suitable type preferably being included in this connection. The connection of such audio stages, being well known, has not been shown in the drawing, a dot and dash line being used to suggest the presence of such intermediate stages. It is obvious, of course, that if head phones were used they could be connected in place of the audio frequency transformer 25, or at any desired intermediate audio stage.

All of the apparatus heretofore described, with the exception of the loud speaker 31, the transformer 25, and the intermediate audio amplification stages, if used, the inductances 1 and 10, and the various batteries, is preferably enclosed within a non-magnetic metallic receptacle 32 in order to shield the apparatus from all external influences, which tend to adversely affect the stability of the various oscillatory circuits. The inductances 1 and 10 are wound on a spool of insulating material 33 which is rigidly supported above the receptacle 32, said inductances being effectively shielded by the non-magnetic metallic hood 34 which is mounted on top of said receptacle and about said inductances. In each end of said hood 34 there is an opening 41 which is in axial alignment with, and of substantially the same diameter as, the bore of the spool 33, so that the wire, rod, or the like, 35 which is to be tested may be passed therethrough. The bore of said spool 33 is preferably made of appreciable diameter, an insulating guide member 36 having a longitudinal opening therein of only slightly greater diameter than that of the wire 35 to be tested being inserted in said bore in order to support the wire 35 at the fixed center of the inductance 1. By simply exchanging one member 36 for another the apparatus may thus be easily adapted to various shapes and sizes of wire. As shown in Figs. 3 and 4 the hood 34 has slots 37 extending radially from the aforesaid openings in each end thereof, and one slot 38 extends to the edge of said hood, and thence longitudinally to a similar slot at the other end of said hood, in order to decrease the eddy currents in said hood due to the electro-magnetic field about the inductance 1. Knobs 39 and 40 which are mounted on the shafts of the condensers 2 and 3 respectively, extend above the housing 32 in order to provide for convenient adjustment of said condensers.

This device is operated, when desired, by heterodyning the fundamental frequencies of the two oscillatory circuits, but I prefer to utilize an important harmonic of each of these frequencies for the production of my audible beat note. For example, I find it convenient to match the third harmonic of the fundamental frequency of the current in coil 1 with the second harmonic of the fundamental frequency of the current in coil 11. This has the dual advantage that it eliminates a number of complications incident to the heterodyning of the fundamental frequencies and in addition greatly increases the beat frequency above the actual variation in the fundamental frequency, thereby giving the device a greater sensitivity to changes. In order to increase the relative proportion of the power which is generated as a harmonic of the fundamental frequencies in the two oscillators the current waves therein are purposely distorted by giving the resistances 9 and 19 a value several times that which would be used if an oscillatory current of substantially undistorted sine wave were desired, it being well known that a distorted, or non-sinusoidal, current wave is rich in harmonics.

In the use and operation of this device a wire or other conductor 35 which is to be tested is coupled with the coil 1 by inserting it in the hole in the insulating guide member 36. The frequency of the oscillatory current in the coil 1 is then adjusted by means of the knobs 39 and 40, which vary the capacity of the condensers 2 and 3, respectively, until it, or preferably a desired harmonic thereof, is substantially the same as the fundamental frequency, or a harmonic thereof, of the current in the coil 11, so that no sound is heard from the loud speaker 31. The wire 35 is then slowly passed through the exploring coil 1, care being used to avoid variations due to changes in body capacity or other external influences upon said wire. Eddy currents are generated in the wire during this process, due to the high frequency field produced by the oscillatory current flowing in the coil 1, these eddy currents being substantially confined to the surface of the wire by the well known skin effect phenomenon which is characteristic of high frequency currents. So long as the wire is free of surface or sub-surface cracks or crevices, or so long as it has a uniform coating in the case of a composite conductor, these eddy currents remain substantially constant; but when a cracked or thinly coated portion of the conductor comes within the electro-magnetic field the path of these eddy currents is abruptly altered, the change being accentuated, of course, by the previously mentioned skin effect, which maintains practically all of the current near the surface of the wire. This change in the eddy currents, which is believed to be a change in phase as well as in amplitude, causes a change of frequency in the oscillatory circuit of which coil 1 is a part, with the result that when said circuit has suitable constants the current flowing through the resistance 23 has an audible beat frequency, causing a noise in the loud speaker 31. The operator is thus warned in an extremely certain manner of the presence of a flaw in the conductor 35. As the wire is moved onward from this point the noise continues, with or without changes in pitch, depending upon the character of the flaw, until the wire is again perfect, after which silence again reigns. The operator is thus enabled to mark the defective portion of the wire in any suitable manner, if it is so desired. The pitch of the audible note is, of course, a guide to the importance of the defect, it being necessary in some cases to reject only those portions of the wire which cause a note increasing in pitch until it passes the audible range.

It may occasionally happen, of course, that the apparatus is adjusted to produce a dead beat between the oscillation generators while a flaw in the conductor 35 is within the influence of the coil 1, in which case it is obvious that a noise will be produced whenever a sound portion of the conductor is included within the coil 1. Where the usual practice of rejecting in entirety a length of conductor which is in part defective is followed this faulty indication would be of little importance. In other cases, however, the abnormally long lengths of supposedly faulty conductor will attract attention, so that this error can be easily corrected.

In order to accentuate the aforesaid "skin effect" it is desirable to use a relatively high frequency in the coil 1. The use of such high frequencies in this coil also has the added advantage that only a relatively small percentage of frequency change is required to give an audible beat note, as compared to the change which would be necessary if lower frequencies were used. In addition the physical dimensions of the inductance 1 may be made relatively small, so that only a limited portion of the wire 35 will be included within the electro-magnetic field at one time, the device being made more sensitive to changes in the wire thereby.

It will be obvious to those skilled in the art that the electrical variations resulting from defects in the wire may also be utilized in other manners than that illustrated and described. For example, a permanent record of the defects may be produced by the use of a suitable recording ammeter, in combination with a circuit having such constants that the current flow is substantially proportional to the frequency, within the range of beat frequencies produced, in place of the sound producing apparatus 31. Such circuits being well known in the art, a further description thereof seems unnecessary.

While I have particularly discussed my invention as applied to the testing of wire which is to be used as an inlead, it is obvious that it is useful in the art generally, whenever it is desirable to locate surface or sub-surface defects in wires, rods, bars or the like, of electrically conducting material. It is also to be understood that while I consider the use of a beat frequency to be the most simple and reliable method of detecting the variations in the impedance of the wire being tested, other methods and apparatus may be used for this purpose, if desired, without departing from the spirit of my invention, as determined by the scope of the appended claims.

I claim as my invention:

1. In apparatus for detecting defects in an electrical conductor, in combination, means to produce a radio frequency electro-magnetic field with the axis of said conductor parallel to the lines of force of said field, means to guide said conductor through said field whereby successive portions of said conductor may be subjected to said field to produce eddy currents therein, and means to compare the energy absorbed by said eddy currents in different portions of said conductor.

2. In apparatus for detecting defects in an electrical conductor, in combination, an oscillation generator comprising an oscillatory circuit and means to maintain oscillations of substantially resonant frequency therein, a portion of said circuit comprising an inductance through which said conductor may be passed to inductively couple successive small portions thereof with said circuit, whereby variations in the electrical characteristics of said conductor due to defects therein cause variations in the frequency produced by said generator, and means responsive to a change in frequency of said generator to indicate the presence of such defects in said conductor.

3. In apparatus for detecting defects in an electrical conductor, in combination, an oscillation generator comprising a circuit resonant at radio frequency and means to maintain oscillations of substantially resonant frequency therein, a portion of said circuit comprising an inductance through which said conductor may be passed to inductively couple successive portions thereof with said circuit, whereby variations in the electrical characteristics of said conductor due to defects near the surface thereof cause variations in the frequency produced by said generator, an oscillation generator of constant radio frequency, means to superimpose currents from said generators on a separate circuit, and means responsive to a current of a beat frequency of said generators to indicate the presence of such defects in said wire.

4. In apparatus for detecting defects in an electrical conductor, in combination, a radio frequency oscillation generator of the type employing an electron tube to supply energy at resonant frequency to an oscillatory circuit, said circuit having an inductance therein through which said conductor may be passed to inductively couple successive small portions thereof with said circuit, whereby variations in the electrical characteristics of said conductor due to defects near the surface thereof produce variations in the frequency produced by said generator, and means responsive to a change in frequency of said generator to indicate the presence of such defects in said conductor.

5. In apparatus for detecting defects in an electrical conductor, in combination, a radio frequency oscillation generator of the type employing an electron tube to supply energy at resonant frequency to an oscillatory circuit, said circuit having an inductance therein through which said conductor may be passed to inductively couple successive portions thereof with said circuit, whereby variations in the electrical characteristics of said conductor due to defects near the surface thereof produce variations in the frequency produced by said generator, an oscillation generator having a constant radio frequency, means to superimpose current from said generators on a separate circuit, and means responsive to a beat frequency between the oscillations of said generators to indicate the presence of such defects in said wire.

6. In apparatus for detecting defects in an electrical conductor, in combination, a radio frequency oscillation generator of the type employing an electron tube to supply energy at resonant frequency to an oscillatory circuit, said circuit having an inductance therein through which said conductor may be passed to inductively couple successive portions thereof with said circuit, whereby variations in the electrical characteristics of said conductor due to defects near the surface thereof produce variations in the frequency produced by said generator, a second oscillation generator, means to superimpose current from said generators on a separate circuit, said generators being adjusted to produce a beat frequency below the audible range when a sound portion of said conductor is within said inductance, and means responsive to current of beat frequency to produce an audible signal whenever said beat frequency is increased to audible range.

7. In apparatus for detecting defects in an electrical conductor, in combination, a radio frequency oscillation generator of the type employing an electron tube to supply energy at resonant frequency to an oscillatory circuit, said circuit having an inductance therein through which said conductor may be passed to inductively couple successive portions thereof with said circuit, whereby variations in the electrical characteristics of said conductor due to defects near the surface thereof produce variations in the frequency produced by said generator, an oscillation generator having a constant radio frequency of such a value that a given harmonic thereof is substantially equal to a higher harmonic of the frequency generated by the first mentioned generator, means to superimpose currents of said harmonic frequencies on a separate circuit, and means responsive to changes in the beat frequency therebetween to indicate the presence of defects in said conductor.

8. In apparatus for detecting defects in an electrical conductor, in combination, a radio frequency oscillation generator of the type employing an electron tube to supply energy at resonant frequency to an oscillatory circuit, said circuit having an inductance therein through which said conductor may be passed to inductively couple successive portions thereof with said circuit, whereby variations in the electrical characteristics of said conductor due to defects near the surface thereof produce variations in the frequency produced by said generator, an oscillation generator having a constant radio frequency of such a value that a given harmonic thereof is substantially equal to a higher harmonic of the frequency generated by the first mentioned generator when a sound portion of said conductor is within the influence of said inductance, means to superimpose currents of said harmonic frequencies on a separate circuit, and means responsive to current of the beat frequency therebetween to produce an audible signal whenever said beat frequency is within the audible range.

9. In apparatus for detecting defects in an electrical conductor, in combination, a radio frequency oscillation generator of the type employing an electron tube to supply energy at resonant frequency to an oscillatory circuit, said circuit having an inductance therein through which said conductor may be passed to inductively couple successive portions thereof with said circuit, whereby variations in the electrical characteristics of said conductor due to defects near the surface thereof produce variations in the frequency produced by said generator, an oscillation generator having a constant radio frequency, means to superimpose current from said generators on a separate circuit, means responsive to a beat frequency between the oscillations of said generators to indicate the presence of such defects in said wire and means to shield all parts of the aforesaid apparatus which are traversed by radio frequency currents from external electrostatic and electro-magnetic influences.

10. The method of locating defects in an electrical conductor which comprises subjecting different portions of said conductor to a radio frequency electro-magnetic field whose lines of force are parallel to the axis of said conductor to produce eddy currents therein, and comparing the energy thus absorbed by said different portions of said conductor.

11. The method of locating defects near the surface of an electrical conductor which comprises maintaining sustained oscillations of resonant frequency in an oscillatory circuit, successively electro-magnetically coupling different small portions of said conductor with said circuit, whereby the changes in electrical characteristics of said conductor due to defects near the surface thereof produce changes in said frequency, and noting variations in said frequency.

12. The method of locating defects near the surface of an electrical conductor which comprises maintaining sustained oscillations of resonant frequency in an oscillatory circuit, electromagnetically coupling successive portions of said conductor with said circuit, whereby the changes in the electrical characteristics of said conductor due to defects near the surface thereof produce changes in said frequency, heterodyning current of said frequency with current from an oscillation generator of constant frequency, and observing changes in the beat frequency therebetween.

13. The method of locating defects near the surface of an electrical conductor which comprises maintaining sustained oscillations of resonant frequency in an oscillatory circuit, electromagnetically coupling successive portions of said conductor with said circuit, whereby the changes in the electrical characteristics of said conductor due to defects near the surface thereof produce changes in said frequency, heterodyning a given harmonic of said frequency with a lower harmonic of another frequency, whereby said changes cause a beat frequency in the audible range, and utilizing current of said beat frequency to produce an audible signal of like frequency.

14. In apparatus for detecting defects in an electrical conductor, in combination, means to produce a radio frequency electro-magnetic field, means to guide said conductor through said field with the axis of said conductor extending in the direction of said field, whereby successive portions of said conductor may be subjected to said field to produce eddy currents therein, and means to compare the energy absorbed by said eddy currents in different portions of said conductor, said last mentioned means including a coil which is continuously linked electro-magnetically with said field.

15. In apparatus for detecting defects in an electrical conductor, in combination, means to produce a radio frequency electro-magnetic field, said means including a coil and an energizing circuit therefor, means to guide said conductor through said field with the axis of said conductor extending in the direction of said field, whereby successive portions of said conductor may be subjected to said field to produce eddy currents therein, and means including a constant coupling independent of said conductor with said energizing circuit to compare the energy absorbed by said eddy currents in different portions of said conductor.

DAVID W. DANA.